US012672017B2

(12) United States Patent
Xu et al.

(10) Patent No.:  US 12,672,017 B2
(45) Date of Patent:  Jun. 30, 2026

(54) NETWORK NODES AND METHODS THEREIN FOR EVENT MONITORING

(71) Applicant: Telefonaktiebolaget LM Ericsson (publ), Stockholm (SE)

(72) Inventors: Wenliang Xu, Shanghai (CN); Fengpei Zhang, Guangdong Guangzhou (CN); Hubert Przybysz, Hägersten (SE); Ping Chen, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 18/576,214

(22) PCT Filed: Jun. 23, 2022

(86) PCT No.: PCT/CN2022/100772
§ 371 (c)(1),
(2) Date: Jan. 3, 2024

(87) PCT Pub. No.: WO2023/279977
PCT Pub. Date: Jan. 12, 2023

(65) Prior Publication Data
US 2024/0214845 A1      Jun. 27, 2024

(30) Foreign Application Priority Data
Jul. 7, 2021    (WO) ................ PCT/CN2021/104874

(51) Int. Cl.
*H04W 24/08*        (2009.01)
*H04L 43/50*        (2022.01)
(52) U.S. Cl.
CPC ............. *H04W 24/08* (2013.01); *H04L 43/50* (2013.01)

(58) Field of Classification Search
CPC ..... H04L 41/14; H04L 41/5009; H04L 43/08; H04L 43/50; H04W 24/08; H04W 4/40; H04W 4/50
See application file for complete search history.

(56) References Cited

U.S. PATENT DOCUMENTS

2021/0007178 A1      1/2021  Pattan et al.

FOREIGN PATENT DOCUMENTS

WO          2021131902 A1      7/2021
WO      WO-2021210942 A1 *  10/2021  ............. H04L 67/63
(Continued)

OTHER PUBLICATIONS

3GPP, "3GPP TS 23.288 V17.1.0", 3rd Generation Partnership Project; Technical Specification Group Services and System Aspects; Architecture enhancements for 5G System (5GS) to support network data analytics services (Release 17), Jun. 2021, 1-192.
(Continued)

*Primary Examiner* — Eron J Sorrell
(74) *Attorney, Agent, or Firm* — Murphy, Bilak & Homiller, PLLC

(57)          ABSTRACT

The present disclosure provides a method (300) in a Vertical Application Layer, VAL, server. The method (300) includes: transmitting (310), to a Network Resource Management, NRM, server, a monitoring event subscription request. The monitoring event subscription request contains: a list of identities, IDs, of one or more VAL users or VAL User Equipments, UEs, for which event monitoring is requested, or a VAL group ID of a group of one or more VAL users or VALUEs for which event monitoring is requested, and a monitoring profile ID corresponding to a list of one or more events to be monitored, or event details indicating a list of one or more events to be monitored. The method (300) further includes: receiving (320), from the NRM server, a
(Continued)

monitoring event subscription response as a response to the monitoring event subscription request.

22 Claims, 4 Drawing Sheets

(56)                    References Cited

FOREIGN PATENT DOCUMENTS

WO       WO-2022008086 A1 *   1/2022   ......... H04L 47/2416
WO          2022075752 A1      4/2022

OTHER PUBLICATIONS

3GPP, "3GPP TS 23.434 V17.2.0", 3rd Generation Partnership Project; Technical Specification Group Services and System Aspects; Service Enabler Architecture Layer for Verticals (SEAL); Functional architecture and information flows; (Release 17), Jun. 2021, 1-165.

3GPP, "3GPP TS 29.520 V17.3.0", 3rd Generation Partnership Project; Technical Specification Group Core Network and Terminals; 5G System; Network Data Analytics Services; Stage 3 (Release 17), Jun. 2021, 1-125.

3GPP, "3rd Generation Partnership Project; Technical Specification Group Core Network and Terminals; 5G System; Network Exposure Function Northbound APIs; Stage 3 (Release 17)", 3GPP TS 29.522 V17.2.0, Jun. 2021, 1-257.

3GPP, "3rd Generation Partnership Project; Technical Specification Group Core Network and Terminals; T8 reference point for Northbound APIs; (Release 17)", 3GPP TS 29.122 V17.2.0, Jun. 2021, 1-429.

3GPP, "3rd Generation Partnership Project; Technical Specification Group Services and System Aspects; Procedures for the 5G System (5GS); Stage 2 (Release 17)", 3GPP TS 23.502 V17.1.0, Jun. 2021, 1-692.

Ericsson, "Improved Event Monitoring Service", 3GPP TSG-SA WG6 Meeting #44, S6-211840, (revision of S6-211797), e-meeting, Jul. 12-20, 2021, 1-5.

Ericsson, "QoS Monitoring support", 3GPP TSG-SA WG6 Meeting #43, S6-211392, (revision of S6-211199 Rev1), e-meeting, May 24-Jun. 2, 2021, 1-10.

3GPP, "3GPP TS 23.434 V2.0.0", 3rd Generation Partnership Project; Technical Specification Group Services and System Aspects; Service Enabler Architecture Layer for Verticals; Functional architecture and information flows; (Release 16), May 2019, 1-112.

Samsung, "Seal Event Monitoring Service", 3GPP TSG-SA WG6 Meeting #42-bis-e, S6-211068, (revision of S6-210863 merging S6-210752), e-meeting, Apr. 12-20, 2021, 1-7.

Ericsson, "Improved Event Monitoring Service", 3GPP TSG-SA WG6 Meeting #44, S6-211622, (revision of S6-21xxxx), e-meeting, Jul. 12-20, 2021, 1-5.

* cited by examiner

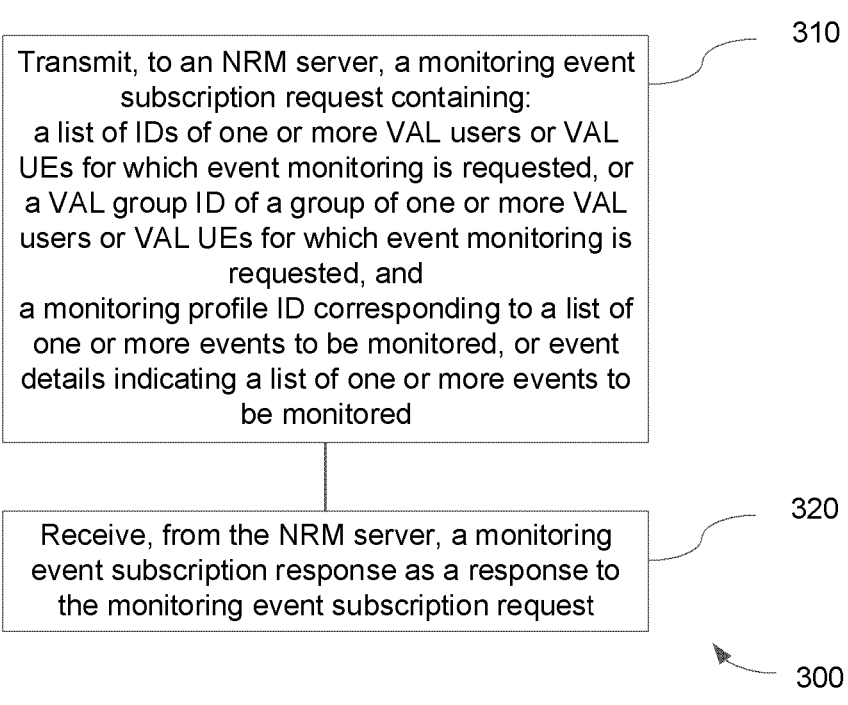

Transmit, to an NRM server, a monitoring event subscription request containing:
a list of IDs of one or more VAL users or VAL UEs for which event monitoring is requested, or a VAL group ID of a group of one or more VAL users or VAL UEs for which event monitoring is requested, and
a monitoring profile ID corresponding to a list of one or more events to be monitored, or event details indicating a list of one or more events to be monitored

310

Receive, from the NRM server, a monitoring event subscription response as a response to the monitoring event subscription request

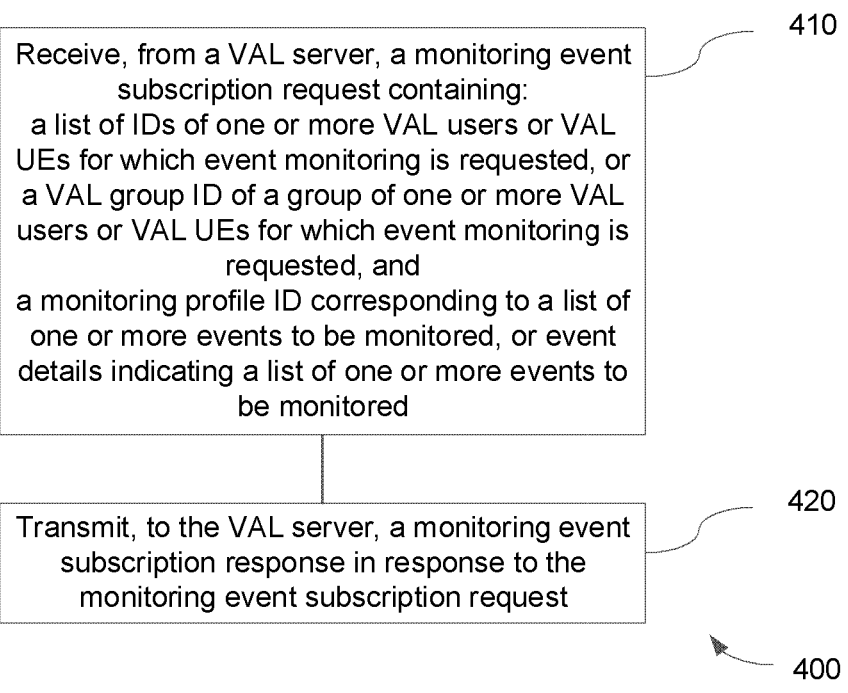

Receive, from a VAL server, a monitoring event subscription request containing:
a list of IDs of one or more VAL users or VAL UEs for which event monitoring is requested, or a VAL group ID of a group of one or more VAL users or VAL UEs for which event monitoring is requested, and
a monitoring profile ID corresponding to a list of one or more events to be monitored, or event details indicating a list of one or more events to be monitored

410

Transmit, to the VAL server, a monitoring event subscription response in response to the monitoring event subscription request

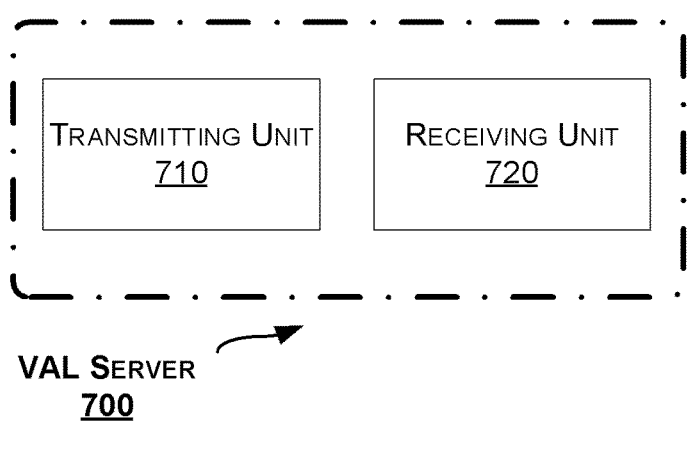
VAL SERVER
700
Fig. 7
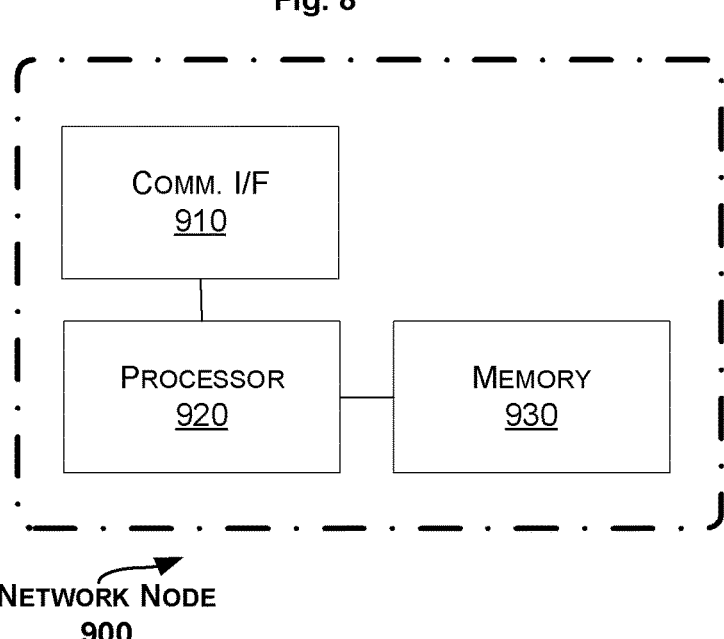
NRM SERVER
800
Fig. 8
NETWORK NODE
900
Fig. 9

NETWORK NODES AND METHODS THEREIN FOR EVENT MONITORING

TECHNICAL FIELD

The present disclosure relates to communication technology, and more particularly, to network nodes and methods therein for event monitoring.

BACKGROUND

Since the 3$^{rd}$ Generation Partnership Project (3GPP) Release 16, Service Enablement Architecture Layer for Verticals (SEAL) has been introduced to support vertical applications (e.g., Vehicle to Everything (V2X) applications). 3GPP Technical Specification (TS) 23.434, V17.2.0, which is incorporated here by reference in its entirety, specifies application plane and signaling plane entities for application-enabling services (e.g., group management, configuration management, location management, identity/key management, network resource management, etc.) that can be reused across vertical applications. The SEAL also specifies northbound Application Programing Interfaces (APIs) for its individual services to enable flexible integration with vertical applications.

FIG. 1 illustrates a generic on-network functional model of SEAL. As shown, in a Vertical Application Layer (VAL), a VAL client communicates with a VAL server over a VAL-UU reference point. The VAL-UU reference point supports both unicast and multicast delivery modes. SEAL functional entities on a User Equipment (UE) and a server are grouped into SEAL client(s) and SEAL server(s) respectively. The SEAL consists of a common set of services (e.g., group management, location management, etc.) and reference points. The SEAL offers its services to the VAL. The SEAL client(s) communicates with the SEAL server(s) over a SEAL-UU reference point. The SEAL-UU reference point supports both unicast and multicast delivery modes. The SEAL client(s) provides service enabler layer support functions to VAL client(s) over a SEAL-C reference point. The VAL server(s) communicates with the SEAL server(s) over a SEAL-S reference point. The SEAL server(s) may communicate with the underlying 3GPP network systems using respective 3GPP interfaces specified by the 3GPP network system.

One of the capabilities the SEAL provides is Network Resource Management (NRM). The NRM is a SEAL service that offers network resource management (e.g., unicast and multicast network resources) related capabilities to one or more vertical applications. FIG. 2 illustrates an on-network functional model of SEAL for NRM. As shown, an NRM client communicates with an NRM server over a NRM-UU reference point. The NRM client provides support for NRM functions to the VAL client(s) over an NRM-C reference point. The VAL server(s) communicate with the NRM server over an NRM-S reference point. The NRM server communicates with a Broadcast Multicast Service Center (BM-SC) via MB2-C and xMB-C reference points to obtain and control multicast resources from the underlying 3GPP network system. The NRM server communicates with a Policy and Charging Rules Function (PCRF) via an Rx reference point and/or communicates with a Policy Control Function (PCF) via an N5 reference point to control unicast resources from the underlying 3GPP network system.

The 3GPP network provides event monitoring functions to Application Functions (AFs) in several network functions, including:

Network Exposure Function (NEF): The Event Exposure API specified in the 3GPP TS 29.522, V17.2.0 and TS 29.122, V17.2.0 provides capabilities such as UE reachability, Packet Data Network (PDN) connectivity status, and loss of connectivity, etc.

Network Data Analytics Function (NWDAF): The Analytics Exposure API specified in TS 29.522, V17.2.0 and TS 29.520, V17.3.0 provides capabilities such as UE mobility, network congestion, and Quality of Service (QoS) sustainability, etc.

In FIG. 2, the NRM server communicates with the NEF via T8/N33 reference points to enable event monitoring functions in an NRM service of SEAL.

However, it is desired that the event monitoring functions in SEAL can provide enhanced functionality instead of simply re-exposing 3GPP core network services, otherwise the VAL server can directly invoke the 3GPP core network services without additional delay due to additional message hops in the NRM service.

SUMMARY

It is an object of the present disclosure to provide network nodes and methods therein, capable of enhancing event monitoring in SEAL, in particular for NRM.

According to a first aspect of the present disclosure, a method in a VAL server is provided. The method includes: transmitting, to an NRM server, a monitoring event subscription request. The monitoring event subscription request contains: a list of identities (IDs) of one or more VAL users or VAL UEs for which event monitoring is requested, or a VAL group ID of a group of one or more VAL users or VAL UEs for which event monitoring is requested; a monitoring profile ID corresponding to a list of one or more events to be monitored, or event details indicating a list of one or more events to be monitored; a VAL service ID identifying a VAL service associated with at least one of the one or more events to be monitored; and one or more validity conditions for at least one of the one or more events to be monitored, wherein the one or more validity conditions comprise one or more temporal and/or spatial conditions for the at least one event to be valid. The method further includes: receiving, from the NRM server, a monitoring event subscription response as a response to the monitoring event subscription request.

In an embodiment, when the monitoring event subscription request contains the event details, the monitoring event subscription response may contain a monitoring profile ID corresponding to the list of the one or more events to be monitored.

In an embodiment, each of the one or more events to be monitored may include a monitoring event or an analytics event.

In an embodiment, the method may further include: receiving, from the NRM server, a notification of at least one of the one or more events to be monitored.

According to a second aspect of the present disclosure, a method in an NRM server is provided. The method includes: receiving, from a VAL server, a monitoring event subscription request. The monitoring event subscription request contains: a list of IDs of one or more VAL users or VAL UEs for which event monitoring is requested, or a VAL group ID of a group of one or more VAL users or VAL UEs for which event monitoring is requested; an monitoring profile ID corresponding to a list of one or more events to be monitored, or event details indicating a list of one or more events to be monitored; a VAL service ID identifying a VAL service associated with at least one of the one or more events to be monitored, and one or more validity conditions for at least one of the one or more events to be monitored, wherein the one or more validity conditions comprise one or more temporal and/or spatial conditions for the at least one event to be valid. The method further includes: transmitting, to the VAL server, a monitoring event subscription response in response to the monitoring event subscription request.

In an embodiment, the method may further include, when the monitoring event subscription request contains the event details: determining a monitoring profile ID corresponding to the list of the one or more events to be monitored based on a correspondence or mapping between monitoring profile IDs and event details. The monitoring event subscription response may contain the determined monitoring profile ID.

In an embodiment, the method may further include, when the monitoring event subscription request contains the monitoring profile ID: determining event details indicating the list of the one or more events to be monitored based on a correspondence or mapping between monitoring profile IDs and event details.

In an embodiment, the correspondence or mapping may be preconfigured by an Operation and Maintenance (O&M) entity, or may be created based on one or more previous monitoring event subscription requests with event details.

In an embodiment, each of the one or more events to be monitored may include a monitoring event or an analytics event.

In an embodiment, the method may further include: transmitting, to a core network node, a request for subscription to at least one of the one or more events to be monitored for the one or more VAL users or VAL UEs; receiving, from the core network node, a notification of the at least one event; and notifying the VAL server about the at least one event.

In an embodiment, the method may further include: determining event specific information for the VAL service based on the VAL service ID.

In an embodiment, the event specific information may be determined based on a correspondence or mapping between VAL service IDs and event specific information, the correspondence or mapping being preconfigured by an O&M entity.

In an embodiment, the determined event specific information may complement event specific information in the event details.

In an embodiment, the event specific information may include a Quality of Service (QoS) requirement for the at least one event.

In an embodiment, the method may further include: transmitting, to a core network node, a request for subscription to the at least one event for the one or more VAL users or VAL UEs, the request containing the event specific information; receiving, from the core network node, a notification of the at least one event; and notifying the VAL server about the at least one event.

In an embodiment, the method may further include: transmitting, to a core network node, a request for subscription to the at least one event for the one or more VAL users or VAL UEs, the request containing the one or more validity conditions; receiving, from the core network node, a notification of the at least one event; and notifying the VAL server about the at least one event.

In an embodiment, the method may further include: transmitting, to a core network node, a request for subscription to the at least one event; receiving, from the core network node, a notification of the at least one event; and notifying the VAL server about the at least one event only when the at least one event is valid in accordance with the one or more validity conditions.

According to a third aspect of the present disclosure, a network node is provided. The network node includes a communication interface, a processor, and a memory. The memory contains instructions executable by the processor whereby the network node is operative to, when implementing a VAL server, perform the method according to the above first aspect, or when implementing an NRM server, perform the method according to the above second aspect.

According to a fourth aspect of the present disclosure, a computer-readable storage medium is provided. The computer-readable storage medium has computer-readable instructions stored thereon. The computer-readable instructions, when executed by a processor of a network node, configure the network node to, when implementing a VAL server, perform the method according to the above first aspect, or when implementing an NRM server, perform the method according to the above second aspect.

With the embodiments of the present disclosure, a VAL server can transmit a monitoring event subscription request to an NRM server, and the monitoring event subscription request can include a VAL group ID of a group of one or more VAL users or UEs for which event monitoring is requested, such that event monitoring can be handled for the group instead of for every individual users or UEs. Additionally or alternatively, the monitoring event subscription request can include a monitoring profile ID corresponding to a list of one or more events to be monitored, such that the NRM server can derive event details indicating the one or more events from the monitoring profile ID. In this way, the event monitoring functionality can be enhanced by providing a value-added API for the VAL server.

BRIEF DESCRIPTION OF THE DRAWINGS

The above and other objects, features and advantages will be more apparent from the following description of embodiments with reference to the figures, in which:

FIG. 3 is a flowchart illustrating a method in a VAL server according to an embodiment of the present disclosure;

FIG. 4 is a flowchart illustrating a method in an NRM server according to another embodiment of the present disclosure;

FIG. 7 is a block diagram of a network node according to an embodiment of the present disclosure;

FIG. 8 is a block diagram of a network node according to another embodiment of the present disclosure; and FIG. 9 is a block diagram of a network node according to yet another embodiment of the present disclosure.

DETAILED DESCRIPTION

Figure 1:
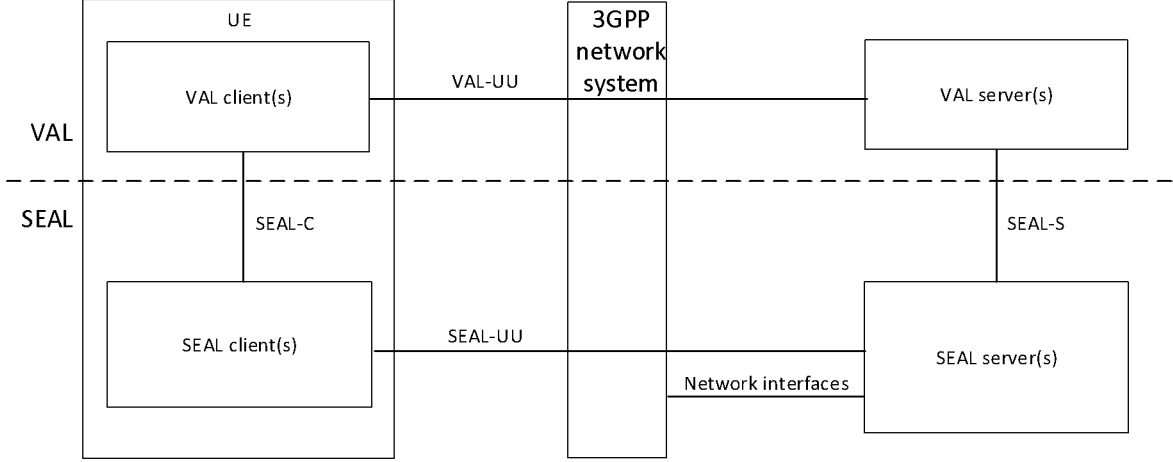
FIG. 1 is a schematic diagram showing a generic on-network functional model of SEAL.
Figure 2:
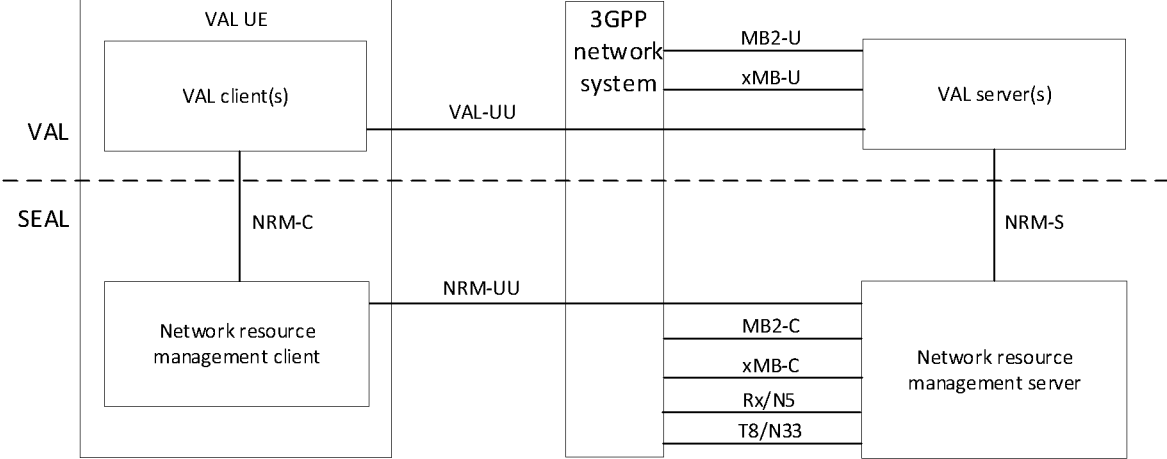
FIG. 2 is a schematic diagram showing an on-network functional model of SEAL for NRM.

In the present disclosure, a network function, or NF, can be implemented either as a network element on a dedicated hardware, as a software instance running on a dedicated hardware, or as a virtualized function instantiated on an appropriate platform, e.g. on a cloud infrastructure.

The term "terminal device" or "UE" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, or 5G (the fifth generation). As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment.

Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 3 is a flowchart illustrating a method 300 according to an embodiment of the present disclosure. The method 300 can be performed at a VAL server.

At block 310, a monitoring event subscription request is transmitted to an NRM server. The monitoring event subscription request contains: i) a list of IDs of one or more VAL users or VAL UEs for which event monitoring is requested, or a VAL group ID of a group of one or more VAL users or VAL UEs for which event monitoring is requested, and ii) a monitoring profile ID corresponding to a list of one or more events to be monitored, or event details indicating a list of one or more events to be monitored.

Here, each of the one or more events to be monitored may be a monitoring event or an analytics event.

At block 320, a monitoring event subscription response is received, from the NRM server, as a response to the monitoring event subscription request.

In an example, when the monitoring event subscription request contains the event details, the monitoring event subscription response may contain a monitoring profile ID corresponding to the list of the one or more events to be monitored.

In an example, the monitoring event subscription request may further contain a VAL service ID identifying a VAL service, such as V2X platooning or IoT mobility, associated with the event monitoring.

In an example, the monitoring event subscription request may further contain one or more validity conditions for at least one of the one or more events to be monitored. Here, the one or more validity conditions may be one or more temporal and/or spatial conditions for the at least one event to be valid. For example, an example of the validity condition may be that an event is valid only from 9:00 am to 10:00 am every Tuesday and/or only in Tracking Areas TA1 and TA2.

In particular, the monitoring event subscription request may be Monitoring Events Subscription Request as defined in TS 23.434, which can be changed as shown in Table 1 below:

TABLE 1

Monitoring Events Subscription Request

| Information element | Status | Description |
|---|---|---|
| Identities list | O (NOTE 1) | List of VAL users or VAL UEs whose events monitoring is requested. |
| VAL group ID | O (NOTE 1) | VAL group ID of the VAL UE group. |
| VAL service ID | O | VAL service ID. |
| Monitoring profile ID | O (NOTE 2) | The monitoring profile ID, which identifies a list of monitoring and/ or analytics events. |
| Validity conditions | O | The temporal and/or spatial conditions applied for the events to be considered as valid. |
| Event Details | O (NOTE 2) | List of monitoring and/or analytics events that the VAL server is interested in. |

(NOTE 1):
For identifying the target UE(s), either a list of VAL users/UEs or a group of VAL UEs shall be provided.
(NOTE 2):
Either Event Details or Monitoring profile ID shall be present.

Moreover, the monitoring event subscription response may be Monitoring Events Subscription Response as defined in TS 23.434, which can be changed as shown in Table 2 below:

TABLE 2

Monitoring Events Subscription Response

| Information element | Status | Description |
|---|---|---|
| Subscription status | M | It indicates the subscription result |
| Monitoring profile ID | O | It indicates the monitoring profile identifier. It is present when Event Details are provided in the Monitoring Events Subscription request. |

In an example, the VAL server may receive, from the NRM server, a notification of at least one of the one or more events to be monitored. For example, the notification may be carried in a Monitoring Events Notification message defined in TS 23.434, which is shown in Table 3 below:

TABLE 3

Monitoring Events Notification

| Information element | Status | Description |
|---|---|---|
| EventDetails | | List of events related to VALUE(s). |
| > identity | M | VAL UE for which the events are related to. |
| > events | M | List of Monitoring and Analytics events related to the VALUE. |
| Timestamp | O | The timestamp for the monitoring and analytics events |

FIG. 4 is a flowchart illustrating a method 400 according to an embodiment of the present disclosure. The method 400 can be performed at an NRM server.

At block 410, a monitoring event subscription request is received from a VAL server. The monitoring event subscription request contains: i) a list of IDs of one or more VAL users or VAL UEs for which event monitoring is requested, or a VAL group ID of a group of one or more VAL users or VAL UEs for which event monitoring is requested, and ii) a monitoring profile ID corresponding to a list of one or more events to be monitored, or event details indicating a list of one or more events to be monitored.

Here, each of the one or more events to be monitored may be a monitoring event or an analytics event.

The monitoring event subscription request may be Monitoring Events Subscription Request as shown in Table 1 above.

At block 420, a monitoring event subscription response is transmitted to the VAL server in response to the monitoring event subscription request.

The monitoring event subscription response may be Monitoring Events Subscription Response as shown in Table 2 above.

In an example, the NRM server can then transmit, to a core network node (e.g., an NEF in a 5G Core (5GC)), a request for subscription to at least one of the one or more events to be monitored for the one or more VAL users or VAL UEs, e.g., according to 3GPP TS 23.502, V17.1.0 (which is incorporated here by reference in its entirety) for UE monitoring events or according to V17.1.0 (which is incorporated here by reference in its entirety) for UE analytics events. Upon receiving, from the core network node, a notification of the at least one event, the NRM server can notify the VAL server about the at least one event, e.g., via a Monitoring Events Notification message shown in Table 3 above.

In an example, when the monitoring event subscription request contains the event details, the NRM server can determine a monitoring profile ID corresponding to the list of the one or more events to be monitored based on a correspondence or mapping between monitoring profile IDs and event details. In this case, the monitoring event subscription response may contain the determined monitoring profile ID.

In an embodiment, when the monitoring event subscription request contains the monitoring profile ID, the NRM server can determine event details indicating the list of the one or more events to be monitored based on a correspondence or mapping between monitoring profile IDs and event details.

For example, the correspondence or mapping may be preconfigured by an O&M entity, or may be dynamically created and/or updated based on one or more previous monitoring event subscription requests with event details.

In an example, the monitoring event subscription request may further contain a VAL service ID identifying a VAL service, such as V2X platooning or IoT mobility, associated with the event monitoring. The NRM server can determine event specific information for the VAL service based on the VAL service ID, e.g., based on a correspondence or mapping between VAL service IDs and event specific information. Here, the correspondence or mapping may be preconfigured by an O&M entity. For example, the event specific information may be a QoS requirement for the at least one event (e.g., QoS requirement for an analytics event). In an example, the determined event specific information may complement or override event specific information in the event details (either the event details in the monitoring event subscription request or the event details determined based on the monitoring profile ID in the monitoring event subscription request). The event specific information may be included in the request for subscription transmitted to the core network node.

In an example, the monitoring event subscription request may further contain one or more validity conditions for at least one of the one or more events to be monitored. Here, the one or more validity conditions may be one or more temporal and/or spatial conditions for the at least one event to be valid. For example, an example of the validity condition may be that an event is valid only from 9:00 am to 10:00 am every Tuesday and/or only in Tracking Areas TA1 and TA2.

In an example, the one or more validity conditions may be included in the request for subscription transmitted to the core network node, such that the core network node can transmit the notification to the NRM server only when the at least one event is valid in accordance with the one or more validity conditions. Alternatively, upon receiving notification of the at least one event from the core network node, the NRM server can determine whether the at least one event is valid in accordance with the one or more validity conditions, and notify the VAL server only when the at least one event is valid in accordance with the one or more validity conditions.

The above methods 300 and 400 will be further explained with reference to FIGS. 5 and 6.

Figure 5:
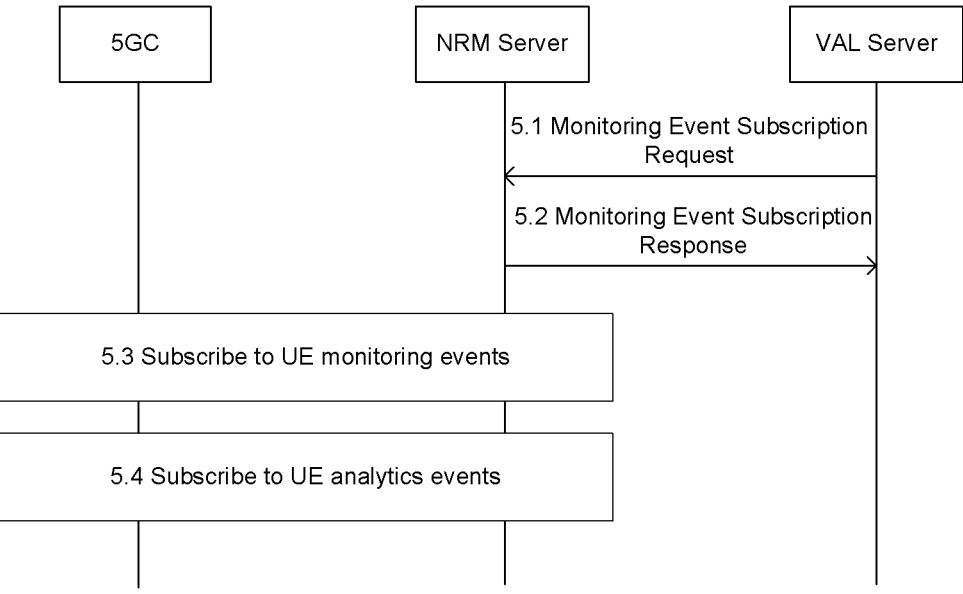
FIG. 5 is a sequence diagram showing an exemplary monitoring events subscription procedure according to an embodiment of the present disclosure.

FIG. 5 is a sequence diagram showing an exemplary monitoring events subscription procedure according to an embodiment of the present disclosure. It is assumed here that the NRM server is authorized to consume the core network services (Monitoring events as specified in 3GPP TS 23.502 and Analytics services as specified in 3GPP TS 23.288).

At 5.1, the VAL server sends a Monitoring Events Subscription request to the NRM server, requesting the NRM server to monitor the events related to the VAL UE(s) as per the subscription request, and shall include the information related to the events that the VAL server is interested in. The VAL server shall include either event details or a Monitoring profile ID for identifying the monitoring and/or analytics events. The VAL server may include VAL service ID, temporal and/or spatial validity conditions applied for the monitoring events.

At 5.2, the NRM server shall check if the VAL server is authorized to initiate the Monitoring Events Subscription request and if authorized, shall respond with a Monitoring Events Subscription Response message, indicating the successful subscription status along with subscription information to the VAL server. If event details are not received, the NRM server derives the event details from the Monitoring profile ID based on a local configuration then uses the derived information to consume the relevant core network services; otherwise, the NRM server uses the received event details to consume the relevant core network services and generates a Monitoring profile ID which is included in the Monitoring Event Subscription response. The VAL service ID may be used by the NRM server to derive event specific information in 3GPP core network services (e.g., a QoS requirement in analytics event subscription).

Here, the mapping between Monitoring profile IDs and event details in the NRM server can be pre-configured by O&M and/or dynamically built based on VAL server request with explicitly sent event details.

At 5.3, based on the events of interest information in the subscription request message, if applicable, the NRM server shall subscribe to the UE monitoring events (like, LOSS_OF_CONNECTIVITY, COMMUNICATION_FAILURE etc.) for the set of UEs (VAL UEs) in the subscription request, as specified in 3GPP TS 23.502.

At 5.4, based on the events of interest information in the subscription request message, if applicable, the NRM server shall subscribe to the UE analytics events (like ABNORMAL_BEHAVIOUR etc.) for the set of UEs (VAL UEs) in the subscription request, as specified in 3GPP TS 23.288.

Figure 6:
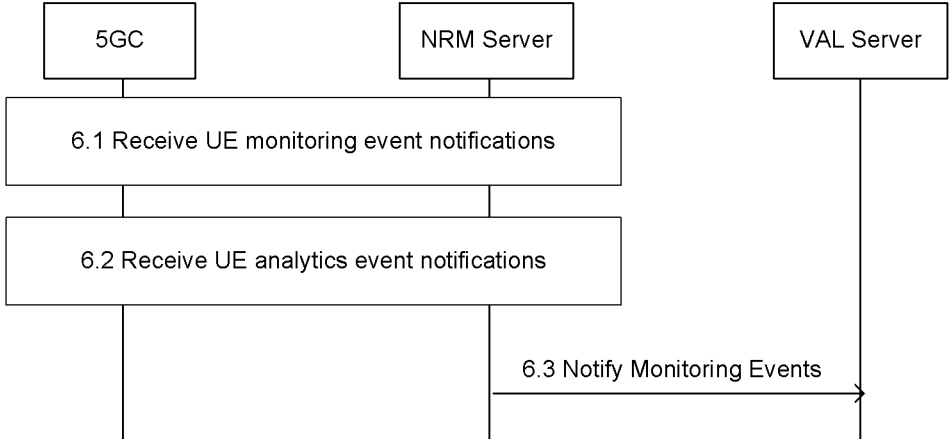
FIG. 6 is a sequence diagram showing an exemplary monitoring events notification procedure according to another embodiment of the present disclosure.

FIG. 6 is a sequence diagram showing an exemplary monitoring events notification procedure according to another embodiment of the present disclosure. It is assumed here that the VAL server has subscribed with the NRM server using the monitoring events subscription procedure as described in FIG. 5.

At 6.1, The NRM server receives the VAL UE related monitoring event notifications from the 3GPP core network as specified in 3GPP TS 23.502.

Alternatively, at 6.2, the NRM server receives the VAL UE related analytics event notifications from the 3GPP core network as specified in 3GPP TS 23.288.

At 6.3, the NRM server notifies the VAL server about the events related to the VAL UE in a Notify Monitoring Events message. If multiple events are to be notified, then the NRM server may aggregate the notifications and send to the VAL server.

Correspondingly to the method 300 as described above, a VAL server is provided. FIG. 7 is a block diagram of a VAL server 700 according to an embodiment of the present disclosure.

The VAL server 700 is operative to perform the method 300 as described above in connection with FIG. 3. The VAL server 700 includes a transmitting unit 710 configured to transmit, to an NRM server, a monitoring event subscription request. The monitoring event subscription request contains: a list of IDs of one or more VAL users or VAL UEs for which event monitoring is requested, or a VAL group ID of a group of one or more VAL users or VAL UEs for which event monitoring is requested, and a monitoring profile ID corresponding to a list of one or more events to be monitored, or event details indicating a list of one or more events to be monitored. The VAL server 700 further includes a receiving unit 720 configured to receive, from the NRM server, a monitoring event subscription response as a response to the monitoring event subscription request.

In an embodiment, when the monitoring event subscription request contains the event details, the monitoring event subscription response may contain a monitoring profile ID corresponding to the list of the one or more events to be monitored.

In an embodiment, the monitoring event subscription request may further contain a VAL service ID identifying a VAL service associated with the event monitoring.

In an embodiment, the monitoring event subscription request may further contain one or more validity conditions for at least one of the one or more events to be monitored.

In an embodiment, the one or more validity conditions may include one or more temporal and/or spatial conditions for the at least one event to be valid.

In an embodiment, each of the one or more events to be monitored may include a monitoring event or an analytics event.

In an embodiment, the receiving unit 720 may be further configured to receive, from the NRM server, a notification of at least one of the one or more events to be monitored.

The units 710 and 720 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Correspondingly to the method 400 as described above, an NRM server is provided. FIG. 8 is a block diagram of an NRM server 800 according to an embodiment of the present disclosure.

The NRM server 800 is operative to perform the method 400 as described above in connection with FIG. 4. The NRM server 800 includes a receiving unit 810 configured to receive, from a VAL server, a monitoring event subscription request.

The monitoring event subscription request contains: a list of IDs of one or more VAL users or VAL UEs for which event monitoring is requested, or a VAL group ID of a group of one or more VAL users or VAL UEs for which event monitoring is requested, and an monitoring profile ID corresponding to a list of one or more events to be monitored, or event details indicating a list of one or more events to be monitored. The NRM server 800 further includes a transmitting unit 820 configured to transmit, to the VAL server, a monitoring event subscription response in response to the monitoring event subscription request.

In an embodiment, the NRM server 800 may further include a determining unit configured to, when the monitoring event subscription request contains the event details: determine a monitoring profile ID corresponding to the list of the one or more events to be monitored based on a correspondence or mapping between monitoring profile IDs and event details. The monitoring event subscription response may contain the determined monitoring profile ID.

In an embodiment, the NRM server 800 may further include a determining unit configured to, when the monitoring event subscription request contains the monitoring profile ID: determine event details indicating the list of the one or more events to be monitored based on a correspondence or mapping between monitoring profile IDs and event details.

In an embodiment, the correspondence or mapping may be preconfigured by an O&M entity, or may be created based on one or more previous monitoring event subscription requests with event details.

In an embodiment, each of the one or more events to be monitored may include a monitoring event or an analytics event.

In an embodiment, the transmitting unit 820 may be further configured to transmit, to a core network node, a request for subscription to at least one of the one or more events to be monitored for the one or more VAL users or VAL UEs. The receiving unit 810 may be further configured to receive, from the core network node, a notification of the at least one event. The transmitting unit 820 may be further configured to notify the VAL server about the at least one event.

In an embodiment, the monitoring event subscription request may further contain a VAL service ID identifying a VAL service associated with at least one of the one or more events to be monitored.

In an embodiment, the NRM server 800 may further include a determining unit configured to determine event specific information for the VAL service based on the VAL service ID.

In an embodiment, the event specific information may be determined based on a correspondence or mapping between VAL service IDs and event specific information, the correspondence or mapping being preconfigured by an O&M entity.

In an embodiment, the determined event specific information may complement event specific information in the event details.

In an embodiment, the event specific information may include a QoS requirement for the at least one event.

In an embodiment, the transmitting unit 820 may be further configured to transmit, to a core network node, a request for subscription to the at least one event for the one or more VAL users or VAL UEs, the request containing the event specific information. The receiving unit 810 may be further configured to receive, from the core network node, a notification of the at least one event. The transmitting unit 820 may be further configured to notify the VAL server about the at least one event.

In an embodiment, the monitoring event subscription request may further contain one or more validity conditions for at least one of the one or more events to be monitored.

In an embodiment, the one or more validity conditions may include one or more temporal and/or spatial conditions for the at least one event to be valid.

In an embodiment, the transmitting unit 820 may be further configured to transmit, to a core network node, a request for subscription to the at least one event for the one or more VAL users or VAL UEs, the request containing the one or more validity conditions. The receiving unit 810 may be further configured to receive, from the core network node, a notification of the at least one event. The transmitting unit 820 may be further configured to notify the VAL server about the at least one event.

In an embodiment, the transmitting unit 820 may be further configured to transmit, to a core network node, a request for subscription to the at least one event. The receiving unit 810 may be further configured to receive, from the core network node, a notification of the at least one event. The transmitting unit 820 may be further configured to notify the VAL server about the at least one event only when the at least one event is valid in accordance with the one or more validity conditions.

The units 810 and 820 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

FIG. 9 is a block diagram of a network node 900 according to another embodiment of the present disclosure.

The network node 900 includes a communication interface 910, a processor 920 and a memory 930.

The memory 930 may contain instructions executable by the processor 920 whereby the network node 900 is operative to, when implementing a VAL server, perform the actions, e.g., of the procedure described earlier in conjunction with FIG. 3. Particularly, the memory 930 may contain instructions executable by the processor 920 whereby the network node 900 is operative to, when implementing the VAL server: transmit, to an NRM server, a monitoring event subscription request. The monitoring event subscription request contains: a list of IDs of one or more VAL users or VAL UEs for which event monitoring is requested, or a VAL group ID of a group of one or more VAL users or VAL UEs for which event monitoring is requested, and a monitoring profile ID corresponding to a list of one or more events to be monitored, or event details indicating a list of one or more events to be monitored. The memory 930 may further contain instructions executable by the processor 920 whereby the network node 900 is operative to, when implementing the VAL server: receive, from the NRM server, a monitoring event subscription response as a response to the monitoring event subscription request.

In an embodiment, when the monitoring event subscription request contains the event details, the monitoring event subscription response may contain a monitoring profile ID corresponding to the list of the one or more events to be monitored.

In an embodiment, the monitoring event subscription request may further contain a VAL service ID identifying a VAL service associated with the event monitoring.

In an embodiment, the monitoring event subscription request may further contain one or more validity conditions for at least one of the one or more events to be monitored.

In an embodiment, the one or more validity conditions may include one or more temporal and/or spatial conditions for the at least one event to be valid.

In an embodiment, each of the one or more events to be monitored may include a monitoring event or an analytics event.

In an embodiment, the memory 930 may further contain instructions executable by the processor 920 whereby the network node 900 is operative to, when implementing the VAL server: receive, from the NRM server, a notification of at least one of the one or more events to be monitored.

Alternatively, the memory 930 may contain instructions executable by the processor 920 whereby the network node 900 is operative to, when implementing an NRM server, perform the actions, e.g., of the procedure described earlier in conjunction with FIG. 4. Particularly, the memory 930 may contain instructions executable by the processor 920 whereby the network node 900 is operative to, when implementing the NRM server: receive, from a VAL server, a monitoring event subscription request. The monitoring event subscription request contains: a list of IDs of one or more VAL users or VAL UEs for which event monitoring is requested, or a VAL group ID of a group of one or more VAL users or VAL UEs for which event monitoring is requested, and an monitoring profile ID corresponding to a list of one or more events to be monitored, or event details indicating a list of one or more events to be monitored. The memory 930 may further contain instructions executable by the processor 920 whereby the network node 900 is operative to, when implementing the NRM server: transmitting, to the VAL server, a monitoring event subscription response in response to the monitoring event subscription request.

In an embodiment, the memory 930 may further contain instructions executable by the processor 920 whereby the network node 900 is operative to, when implementing the NRM server: when the monitoring event subscription request contains the event details, determine a monitoring profile ID corresponding to the list of the one or more events to be monitored based on a correspondence or mapping between monitoring profile IDs and event details. The monitoring event subscription response may contain the determined monitoring profile ID.

In an embodiment, the memory 930 may further contain instructions executable by the processor 920 whereby the network node 900 is operative to, when implementing the NRM server: when the monitoring event subscription request contains the monitoring profile ID, determining event details indicating the list of the one or more events to be monitored based on a correspondence or mapping between monitoring profile IDs and event details.

In an embodiment, the correspondence or mapping may be preconfigured by an O&M entity, or may be created based on one or more previous monitoring event subscription requests with event details.

In an embodiment, each of the one or more events to be monitored may include a monitoring event or an analytics event.

In an embodiment, the memory 930 may further contain instructions executable by the processor 920 whereby the network node 900 is operative to, when implementing the NRM server: transmit, to a core network node, a request for subscription to at least one of the one or more events to be monitored for the one or more VAL users or VAL UEs; receive, from the core network node, a notification of the at least one event; and notify the VAL server about the at least one event.

In an embodiment, the monitoring event subscription request may further contain a VAL service ID identifying a VAL service associated with at least one of the one or more events to be monitored.

In an embodiment, the memory 930 may further contain instructions executable by the processor 920 whereby the network node 900 is operative to, when implementing the NRM server: determine event specific information for the VAL service based on the VAL service ID.

In an embodiment, the event specific information may be determined based on a correspondence or mapping between VAL service IDs and event specific information, the correspondence or mapping being preconfigured by an O&M entity.

In an embodiment, the determined event specific information may complement event specific information in the event details.

In an embodiment, the event specific information may include a QoS requirement for the at least one event.

In an embodiment, the memory 930 may further contain instructions executable by the processor 920 whereby the network node 900 is operative to, when implementing the NRM server: transmit, to a core network node, a request for subscription to the at least one event for the one or more VAL users or VAL UEs, the request containing the event specific information; receive, from the core network node, a notification of the at least one event; and notify the VAL server about the at least one event.

In an embodiment, the monitoring event subscription request may further contain one or more validity conditions for at least one of the one or more events to be monitored.

In an embodiment, the one or more validity conditions may include one or more temporal and/or spatial conditions for the at least one event to be valid.

In an embodiment, the memory 930 may further contain instructions executable by the processor 920 whereby the network node 900 is operative to, when implementing the NRM server: transmit, to a core network node, a request for subscription to the at least one event for the one or more VAL users or VAL UEs, the request containing the one or more validity conditions; receive, from the core network node, a notification of the at least one event; and notify the VAL server about the at least one event.

In an embodiment, the memory 930 may further contain instructions executable by the processor 920 whereby the network node 900 is operative to, when implementing the NRM server: transmit, to a core network node, a request for subscription to the at least one event; receive, from the core network node, a notification of the at least one event; and 15                                                                       16 notify the VAL server about the at least one event only when the at least one event is valid in accordance with the one or more validity conditions.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920 causes the network node 900 to perform, when implementing a VAL server, the actions, e.g., of the procedure described earlier in conjunction with FIG. 3, or perform, when implementing an NRM server, the actions, e.g., of the procedure described earlier in conjunction with FIG. 4.

The computer program product may be configured as a computer program code structured in computer program modules. The computer program modules could essentially perform the actions of the flow illustrated in FIG. 3 or 4.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Vertical Application Layer (VAL) server, comprising:
   transmitting, to a Network Resource Management (NRM) server, a monitoring event subscription request containing:
   a list of identities (IDs) of one or more VAL users or VAL User Equipments (UEs) for which event monitoring is requested, or a VAL group ID of a group of one or more VAL users or VAL UEs for which event monitoring is requested;
   a monitoring profile ID corresponding to a list of one or more events to be monitored, or event details indicating a list of one or more events to be monitored;
   a VAL service ID identifying a VAL service associated with at least one of the one or more events to be monitored; and
   one or more validity conditions for at least one of the one or more events to be monitored, wherein the one or more validity conditions comprise one or more temporal and/or spatial conditions for the at least one event to be valid; and receiving, from the NRM server, a monitoring event subscription response as a response to the monitoring event subscription request, wherein when the monitoring event subscription request contains the event details, the monitoring event subscription response contains a monitoring profile ID corresponding to the list of the one or more events to be monitored.

2. The method of claim 1, wherein each of the one or more events to be monitored comprises a monitoring event or an analytics event.

3. The method of claim 1, further comprising receiving, from the NRM server, a notification of at least one of the one or more events to be monitored.

4. A method in a Network Resource Management (NRM) server, comprising:
   receiving, from a Vertical Application Layer (VAL) server, a monitoring event subscription request containing:
   a list of identities (IDs) of one or more VAL users or VAL User Equipments (UEs) for which event monitoring is requested, or a VAL group ID of a group of one or more VAL users or VAL UEs for which event monitoring is requested;
   a monitoring profile ID corresponding to a list of one or more events to be monitored, or event details indicating a list of one or more events to be monitored;
   a VAL service ID identifying a VAL service associated with at least one of the one or more events to be monitored; and
   one or more validity conditions for at least one of the one or more events to be monitored, wherein the one or more validity conditions comprise one or more temporal and/or spatial conditions for the at least one event to be valid; and
   transmitting, to the VAL server, a monitoring event subscription response in response to the monitoring event subscription request;
   wherein the method further comprises, when the monitoring event subscription request contains the event details, determining a monitoring profile ID corresponding to the list of the one or more events to be monitored based on a correspondence or mapping between monitoring profile IDs and event details, wherein the monitoring event subscription response contains the determined monitoring profile ID.

5. The method of claim 4, further comprising, when the monitoring event subscription request contains the monitoring profile ID, determining event details indicating the list of the one or more events to be monitored based on a correspondence or mapping between monitoring profile IDs and event details.

6. The method of claim 4, wherein the correspondence or mapping is preconfigured by an Operation and Maintenance (O&M) entity, or is created based on one or more previous monitoring event subscription requests with event details.

7. The method of claim 4, wherein each of the one or more events to be monitored comprises a monitoring event or an analytics event.

8. The method of claim 4, further comprising:
   transmitting, to a core network node, a request for subscription to at least one of the one or more events to be monitored for the one or more VAL users or VAL UEs;
   receiving, from the core network node, a notification of the at least one event; and
   notifying the VAL server about the at least one event.

9. The method of claim 8, wherein the notifying step further comprises notifying aggregated events to the VAL server if there are multiple events to be notified.

10. The method of claim 4, further comprising determining event specific information for the VAL service based on the VAL service ID.

11. The method of claim 10, wherein the event specific information is determined based on a correspondence or mapping between VAL service IDs and event specific information, the correspondence or mapping being preconfigured by an O&M entity.

12. The method of claim 10, wherein the determined event specific information complements event specific information in the event details.

13. The method of claim 10, wherein the event specific information comprises a Quality of Service (QoS) requirement for the at least one event.

14. The method of claim 10, further comprising:

transmitting, to a core network node, a request for subscription to the at least one event for the one or more VAL users or VAL UEs, the request containing the event specific information;

receiving, from the core network node, a notification of the at least one event; and notifying the VAL server about the at least one event.

15. The method of claim 4, further comprising:

transmitting, to a core network node, a request for subscription to the at least one event for the one or more VAL users or VAL UEs, the request containing the one or more validity conditions;

receiving, from the core network node, a notification of the at least one event; and notifying the VAL server about the at least one event.

16. The method of claim 4, further comprising:

transmitting, to a core network node, a request for subscription to the at least one event;

receiving, from the core network node, a notification of the at least one event; and notifying the VAL server about the at least one event only when the at least one event is valid in accordance with the one or more validity conditions.

17. A network node comprising:

a communication interface;

a processor; and a memory, the memory comprising instructions executable by the processor whereby the network node is operative to implement a Vertical Application Layer (VAL) server by:

transmitting, to a Network Resource Management (NRM) server, a monitoring event subscription request containing:

a list of identities (IDs) of one or more VAL users or VAL User Equipments (UEs) for which event monitoring is requested, or a VAL group ID of a group of one or more VAL users or VAL UEs for which event monitoring is requested;

a monitoring profile ID corresponding to a list of one or more events to be monitored, or event details indicating a list of one or more events to be monitored;

a VAL service ID identifying a VAL service associated with at least one of the one or more events to be monitored; and one or more validity conditions for at least one of the one or more events to be monitored, wherein the one or more validity conditions comprise one or more temporal and/or spatial conditions for the at least one event to be valid; and receiving, from the NRM server, a monitoring event subscription response as a response to the monitoring event subscription request, wherein, when the monitoring event subscription request contains the event details, the monitoring event subscription response contains a monitoring profile ID corresponding to the list of the one or more events to be monitored.

18. A network node comprising:

a communication interface;

a processor; and a memory, the memory comprising instructions executable by the processor whereby the network node is operative to implement a Network Resource Management (NRM) server by:

receiving, from a Vertical Application Layer (VAL) server, a monitoring event subscription request containing:

a list of identities (IDs) of one or more VAL users or VAL User Equipments (UEs) for which event monitoring is requested, or a VAL group ID of a group of one or more VAL users or VAL UEs for which event monitoring is requested;

a monitoring profile ID corresponding to a list of one or more events to be monitored, or event details indicating a list of one or more events to be monitored;

a VAL service ID identifying a VAL service associated with at least one of the one or more events to be monitored; and one or more validity conditions for at least one of the one or more events to be monitored, wherein the one or more validity conditions comprise one or more temporal and/or spatial conditions for the at least one event to be valid; and transmitting, to the VAL server, a monitoring event subscription response in response to the monitoring event subscription request;

the memory comprising instructions executable by the processor whereby the network node is operative to, when the monitoring event subscription request contains the event details, determine a monitoring profile ID corresponding to the list of the one or more events to be monitored based on a correspondence or mapping between monitoring profile IDs and event details, wherein the monitoring event subscription response contains the determined monitoring profile ID.

19. The network node of claim 18, the memory comprising instructions executable by the processor whereby the network node is operative to, when the monitoring event subscription request contains the monitoring profile ID, determine event details indicating the list of the one or more events to be monitored based on a correspondence or mapping between monitoring profile IDs and event details.

20. The network node of claim 18, the memory comprising instructions executable by the processor whereby the network node is operative to:

transmit, to a core network node, a request for subscription to at least one of the one or more events to be monitored for the one or more VAL users or VAL UEs;

receive, from the core network node, a notification of the at least one event; and notify the VAL server about the at least one event.

21. A computer-readable storage medium having computer-readable instructions stored thereon, the computer-readable instructions, when executed by a processor of a network node, configure the network node to implement a Vertical Application Layer (VAL) server by:

transmitting, to a Network Resource Management (NRM) server, a monitoring event subscription request containing:

a list of identities (IDs) of one or more VAL users or VAL User Equipments (UEs) for which event monitoring is requested, or a VAL group ID of a group of one or more VAL users or VAL UEs for which event monitoring is requested;

a monitoring profile ID corresponding to a list of one or more events to be monitored, or event details indicating a list of one or more events to be monitored;

a VAL service ID identifying a VAL service associated with at least one of the one or more events to be monitored; and one or more validity conditions for at least one of the one or more events to be monitored, wherein the one or more validity conditions comprise one or more temporal and/or spatial conditions for the at least one event to be valid; and receiving, from the NRM server, a monitoring event subscription response as a response to the monitoring event subscription request, wherein when the monitoring event subscription request contains the event details, the monitoring event subscription response contains a monitoring profile ID corresponding to the list of the one or more events to be monitored.

22. A computer-readable storage medium having computer-readable instructions stored thereon, the computer-readable instructions, when executed by a processor of a network node, configure the network node to implement a Network Resource Management (NRM) server by:

receiving, from a Vertical Application Layer (VAL) server, a monitoring event subscription request containing:

a list of identities (IDs) of one or more VAL users or VAL User Equipments (UEs) for which event monitoring is requested, or a VAL group ID of a group of one or more VAL users or VAL UEs for which event monitoring is requested;

a monitoring profile ID corresponding to a list of one or more events to be monitored, or event details indicating a list of one or more events to be monitored;

a VAL service ID identifying a VAL service associated with at least one of the one or more events to be monitored; and one or more validity conditions for at least one of the one or more events to be monitored, wherein the one or more validity conditions comprise one or more temporal and/or spatial conditions for the at least one event to be valid; and transmitting, to the VAL server, a monitoring event subscription response in response to the monitoring event subscription request;

wherein the computer-readable instructions, when executed by the processor of the network node, further configure the network node to implement the NRM server by, when the monitoring event subscription request contains the event details, determining a monitoring profile ID corresponding to the list of the one or more events to be monitored based on a correspondence or mapping between monitoring profile IDs and event details, wherein the monitoring event subscription response contains the determined monitoring profile ID.

* * * * *